53-453 S-
3/31/87 RE 32,383

United States Patent [19]

Banks et al.

[11] E Patent Number: Re. 32,383

[45] Reissued Date of Patent: Mar. 31, 1987

[54] EXPANDABLE BAG AND METHOD OF MANUFACTURE

[75] Inventors: Russell Banks, Pawling, N.Y.; David J. Magid, Doylestown, Pa.

[73] Assignee: Enviro-Spray Systems Incorporated, Montgomeryville, Pa.

[21] Appl. No.: 739,541

[22] Filed: May 30, 1985

Related U.S. Patent Documents

Reissue of:

[64] Patent No.: 4,510,734
Issued: Apr. 16, 1985
Appl. No.: 419,073
Filed: Sep. 16, 1982

U.S. Applications:

[62] Division of Ser. No. 172,357, Jul. 25, 1980, Pat. No. 4,376,500.

[51] Int. Cl.[4] ..... B65B 31/10; B65B 5/02

[52] U.S. Cl. ..... 53/449; 53/453; 53/470; 53/474

[58] Field of Search ..... 53/470, 474, 433, 434, 53/453, 454, 449; 222/386.5

[56] References Cited

U.S. PATENT DOCUMENTS

| | | | |
|---|---|---|---|
| 2,815,152 | 12/1957 | Mills | 53/470 X |
| 2,900,258 | 8/1959 | Wagner | 53/453 X |
| 2,907,173 | 10/1959 | Robbins | 53/474 X |
| 3,023,750 | 3/1962 | Baron | 222/386.5 X |
| 3,578,210 | 5/1971 | Pitrolffy-Szabo | 222/399 X |
| 3,718,236 | 2/1973 | Reyner et al. | 222/386.5 |
| 3,763,622 | 10/1973 | Stanley, Jr. | 53/474 X |
| 3,940,905 | 3/1976 | Perry, 3rd | 53/474 X |
| 3,946,534 | 3/1976 | Egly | 53/474 X |
| 4,322,465 | 3/1982 | Webster | 428/453 X |

*Primary Examiner*—Horace M. Culver
*Attorney, Agent, or Firm*—Kenyon & Kenyon

[57] ABSTRACT

A fluid impervious expandable enclosed bag containing separately compartmented first and second gas generating components which, upon admixture in successive amounts, generate gas causing the bag to expand gradually from a collapsed condition to an ultimately fully expanded condition. The internal compartmentation in the bag also contains a solvent medium and a time release capsule of one of the components, thereby providing apparatus that can be mass produced and used for insertion into aerosol-type liquid product dispensing containers to provide relatively constant expulsion pressure during use.

17 Claims, 13 Drawing Figures

29
28
33
A
31
31
32
30
34
34
35
32
35
37
35
32
36
B
38
39
42
49
41
32
35
C
39
43
44
47
41
32
35
D

Fig. 12.
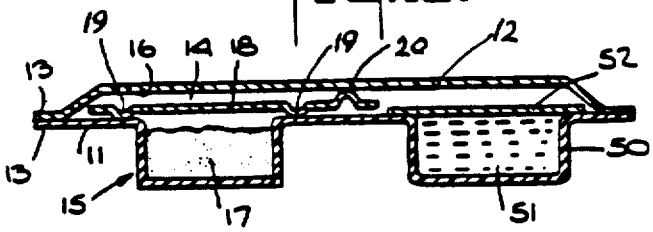
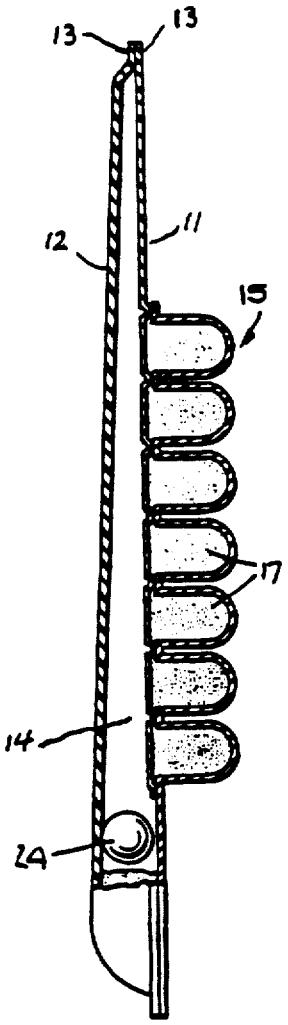
Fig. 11.
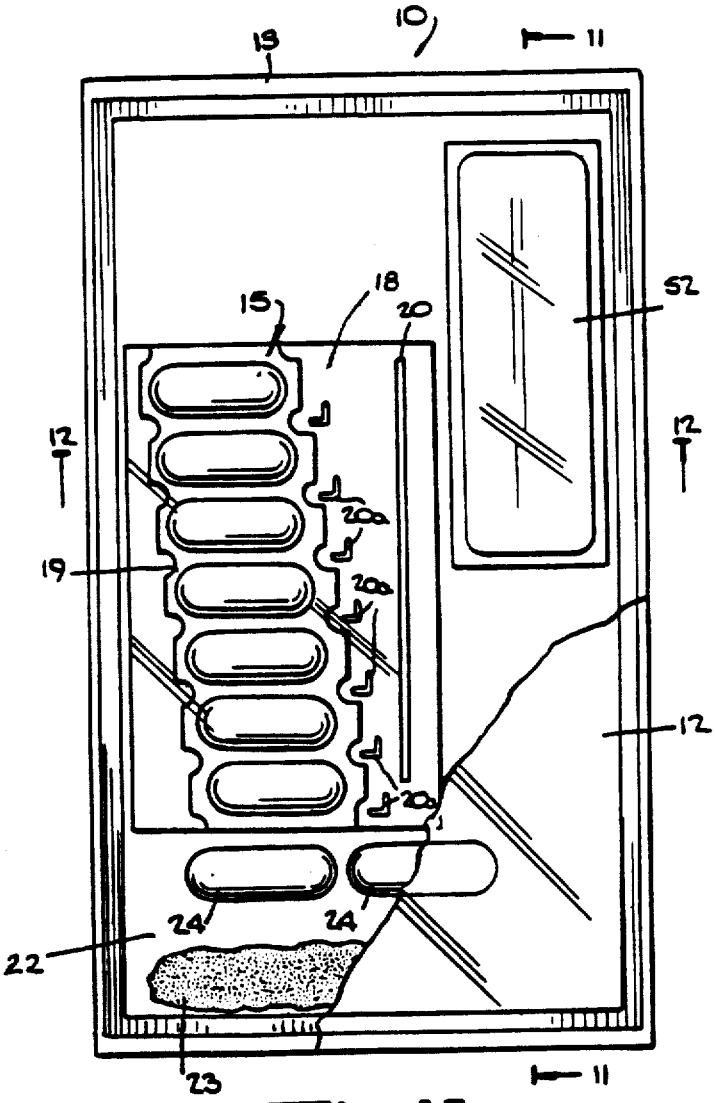
Fig. 10.

EXPANDABLE BAG AND METHOD OF MANUFACTURE

Matter enclosed in heavy brackets [ ] appears in the original patent but forms no part of this reissue specification; matter printed in italics indicates the additions made by reissue.

RELATED APPLICATIONS

This application is a divisional case from application Ser. No. 172,357 filed July 25, 1980 and now U.S. Pat. No. 4,376,500 to present claims to the method of manufacture of a fluid impervious expandable closed bag.

BACKGROUND OF THE INVENTION

Because of environmental considerations, the substantial increase in the cost of hydrocarbons, the problem of contamination of the dispensed product by the propellant, and the problem of flammability, there has been considerable research and development activity in recent years to find other expulsion means for aerosol-type and other pressurized dispensers.

For many years there have been manual pump-type dispensers, some of which are still in use, and there have been various attempts to use spring-loaded diaphragms and other mechanical means to provide expulsion pressure, but for several reasons each type has had serious deficiencies. Gaseous media other than the usual freon and freon derivatives and homologs, and isobutane/butane mixtures, have also had their drawbacks, e.g., the required useful pressures have either been too high, depending on the compressibility of the gas, and/or constant dispensing pressure over the useful life of the packaged contents was not possible.

Furthermore, as previously mentioned, it is frequently desirable in some applications that the pressure generating medium not mix in direct contact with the product to be dispensed.

One recent development that has apparently solved the above problems and achieved substantial success is the invention disclosed and claimed in U.S. patent application Ser. No. 105,216 filed Dec. 19, 1979, abandoned in favor of continuation application Ser. No. 223,422 filed Jan. 8, 1981, and now U.S. Pat. No. 4,360,131 owned by the common assignee hereof. The latter invention utilizes a flexible enclosed plastic bag containing an envelope attached to the interior walls of the bag and having pockets carrying one of a two-compartment gas generating mixture therein which are sequentially opened during expansion of the bag to empty the contents into the bag in admixture with the second gas generating components to generate additional gas. The preferred components are citric acid and sodium bicarbonate which in admixture generate carbon dioxide gas.

In said prior application the bag is fabricated at the point of assembling the aerosol can, and water, sodium bicarbonate and a starting capsule or tablet containing an aliquot of the citric acid are inserted, the bag being heat sealed and inserted into the can just prior to filling the can with the product and sealing of the can.

The present invention is a further extension of the latter concept providing greater utility and flexibility in the manufacture of aerosol-type dispensers and permitting the geographical separation of the various manufacturing operations.

BRIEF SUMMARY OF THE INVENTION

The present inventive concept involves a flexible inflatable bag for use as an expulsion means in an aerosol-type fluid product dispenser which can be completely fabricated, ready for use, but transportable to other geographical locations for incorporation into the other dispensing apparatus. The gas generating components, including the solvent medium (e.g. water) and time release starting capsule, are separated in the bag as initially constructed, but readily mixable by appropriate mechanical manipulation of the package at the point of final assembly with said other dispensing apparatus.

Basically, the bag comprises a first group of compartments disposed in the bag in serial alignment containing a first gas generating component such as citric acid, powdered or in a water solution. The compartments are releasably sealed to the internal sidewall of said bag in the collapsed condition. The second component (e.g. sodium bicarbonate) is disposed within the bag external of the first group of compartments. A solvent medium such as water is contained in a separate rupturable separate bag or compartment inside the bag. A time release capsule of the first component is located in the bag, usually adjacent the second component, such that it can be dissolved in the solvent medium when desired to initially activate the gas generating system, i.e., at the point of final assembly of the bag into an aerosol can, and thus brought into admixture with the second component. The first group of compartments is successively unsealable from the sidewall of the bag during expansion of the bag to discharge the first component therein into admixture with the solvent containing the second component, to maintain generation of said gas and a relatively constant pressure thereof until the bag reaches its fully expanded condition.

Such a unitary bag construction permits automatic fabrication and assembly of the bags in a continuous strip of successive bags which can be rolled up and shipped to a final assembly location and sequentially severed, activated and assembled with the other aerosol product and can components by automatic machines.

DESCRIPTION OF THE DRAWINGS

FIG. 10 is an enlarged top plan view of another embodiment of the bag;

FIG. 11 is a longitudinal section taken along lines 11—11 of FIG. 10;

FIG. 12 is a transverse section taken along lines 12—12 of FIG. 10; and

DETAILED DESCRIPTION

Figure 6:
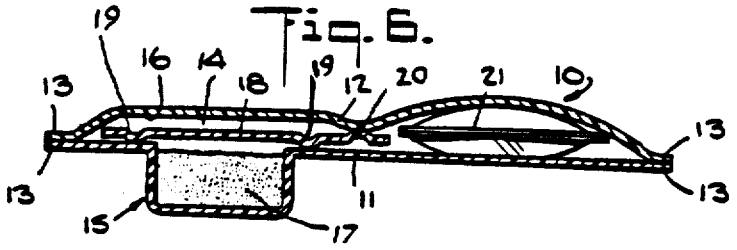
FIG. 6 is a transverse section taken along lines 6—6 of FIG. 4.
Figure 5:
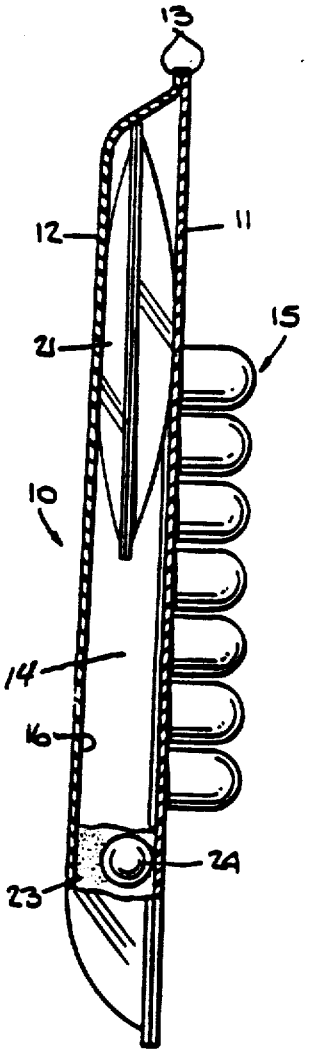
FIG. 5 is a longitudinal section taken along lines 5—5 of FIG. 4.
Figure 4:
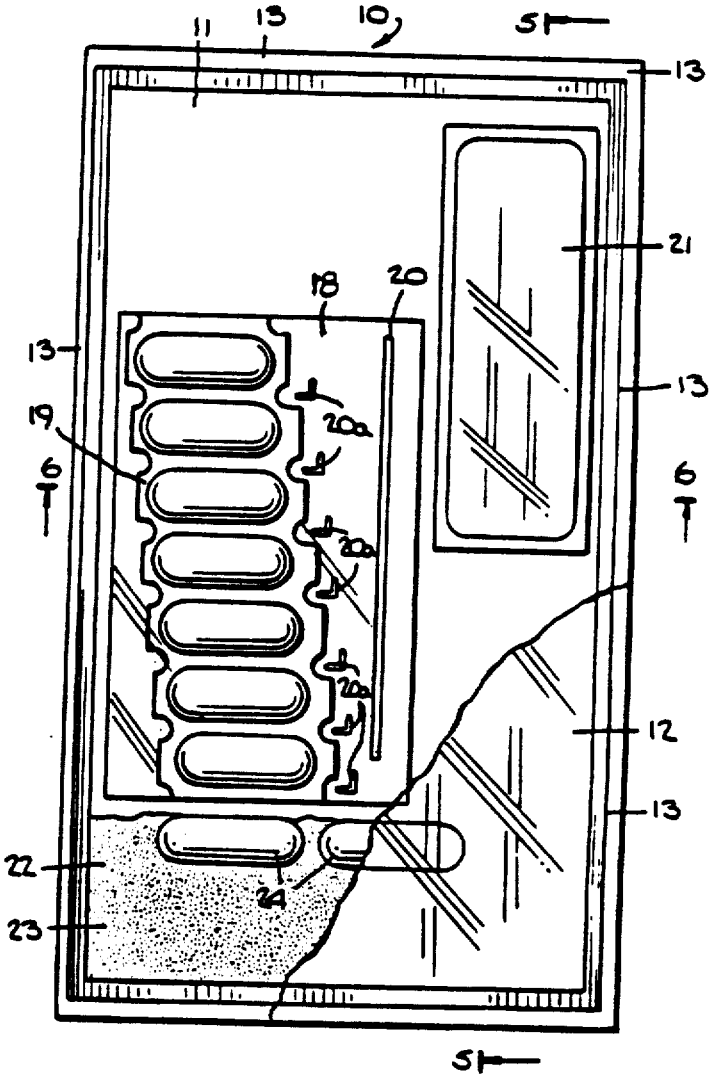
FIG. 4 is an enlarged top plan view of one embodiment of the bag.

Referring now to the drawings, one embodiment of the bag assembly according to the present invention is shown in FIGS. 4–6 and designated generally by reference number 10.

The bag is comprised of plastic sheets 11 and 12 which in the embodiment shown are generally rectangular in shape and adhered to one another, e.g., by heat sealing or other conventional methods, at their respective margins 13 to provide the sidewalls of the bag-like device with an open interior 14.

Sheet 11 has a plurality of compartments or recesses 15 formed therein by vacuum forming or other conventional means, each such recess facing the inner surface 16 of opposite sheet 12 (see FIG. 5).

Recesses 15 are disposed generally longitudinally of said bag assembly 10 in a staggered fashion at one side thereof and disposed within each such recess is one component 17 of a two-component gas generating system, e.g., citric acid, which can be either in powdered or water solution form as desired. Recesses 15 are closed by separate plastic sheet 18 which is releasably adhered to sheet 11 along the marginal areas 19 surrounding said plurality of recesses 15 by suitable means such as heat sealing. Sheet 18 on its outer surface, i.e., the surface opposite that in contact with sheet 11, is permanently adhered to inner surface 16 of outer bag sheet 12 along longitudinal portion or separation seal 20 and sheet 18 is further adhered to sheet 11 by angular portions or guard seals 20a adjacent respective recesses 15 (see FIG. 4), all such connections designed to provide a sequential opening of recesses 15 during use which will be described in detail hereinafter.

A separate, smaller, independent bag 21 is disposed within larger bag 10 adjacent the longitudinal side opposite that on which recesses 15 are disposed, or to the right as viewed in FIG. 4. Bag 21 is charged with the solvent medium, e.g., water, and is fabricated of suitable, rupturable sheet material for purposes to be described.

At the interior bottom portion 22 of bag 10 is disposed second gas generating component 23, e.g., sodium bicarbonate or citric acid. This component is in dry powdered form. Two time release capsules 24 containing the same gas generating component as the recesses 15 are also disposed at the bottom portion 22 of bag 10 adjacent component 23.

Figure 7:
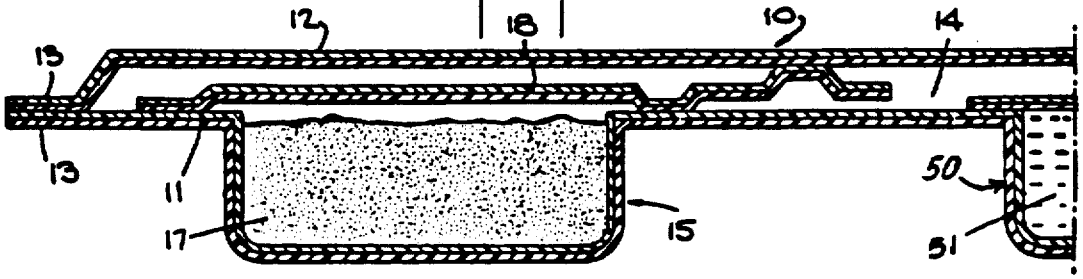
FIG. 7 is an enlarged fragmentary section of the bag showing one of the gas generating component compartments.

Bag 10 may be constructed of a flexible, fluid impermeable plastic such as, for example, polyethylene or polypropylene and in one embodiment may be a laminated plastic of low-density polyethylene and polypropylene with optionally one or more intermediate plastic layers of other materials (see FIG. 7). The low-density polyethylene layer may vary from about 0.5 to about 20 mils in thickness and the polypropylene layer from about 0.1 to about 3.75 mils thickness or more. Bag 10 may also be fabricated if desired from foil (e.g., aluminum foil) or from a foil/plastic laminate. The latter composite bag structure is particularly suitable when the present invention is used for dispensing medicines or drugs and the like. Where releasable seals have been mentioned hereinabove, using the laminated polyethylene/polypropylene would involve polypropylene to polyethylene contacting surfaces of the respective sheets involved, i.e., non-homogeneous or incompatible interfaces, and where a permanent seal is required, a polypropylene to polypropylene, or polyethylene to polyethylene, interface is required, i.e., homogeneous or compatible interfaces, all of which is well known to those skilled in the art. Other permanent and releasable sealing methods can be employed by the use of appropriate separate conventional and well-known adhesive compositions, if desired.

While citric acid and sodium bicarbonate have been shown as suitable two-component gas generating ($CO_2$) components, it is possible that under particular circumstances other components may be used such as diluted hydrochloric acid (e.g., 10–30% up to about 35%) in place of the citric acid and lithium carbonate or calcium carbonate in place of the sodium bicarbonate. Normal operating pressure is, for example, 100 psi, the aerosol can being rated at 180 psi. The operating pressure can be predetermined by the starting charges and concentrations of the two gas generating components and the charges of the one component in recesses 15. Furthermore, the concentrations of citric acid in the recesses 15 can be varied from recess to recess, e.g., it may be desired to have heavier acid concentrations in the last one or two recesses (at the upper recesses as viewed in FIG. 4). Time release capsules 24 preferably utilize an outer shell material designed to dissolve and expose the internal citric acid within a 3 to 5 minute period with or without external heat being applied to the system to enable starting the initial activation of gas generating components and their assembly of bag 10 into aerosol can 25 before expansion of bag 10 begins.

Variations are possible. For example, water pouch or bag 21 may contain the sodium bicarbonate dissolved in the water rather than have the sodium bicarbonate in powder form in the bottom 22 of bag 10 as described above. On the other hand, the water bag 21 may contain the startup amount of citric acid dissolved in the water rather than having the startup capsules 24 in the bottom 22 of bag 10, in which case time release beaded sodium bicarbonate would be used in the bottom 22 of bag 10.

Figure 8:
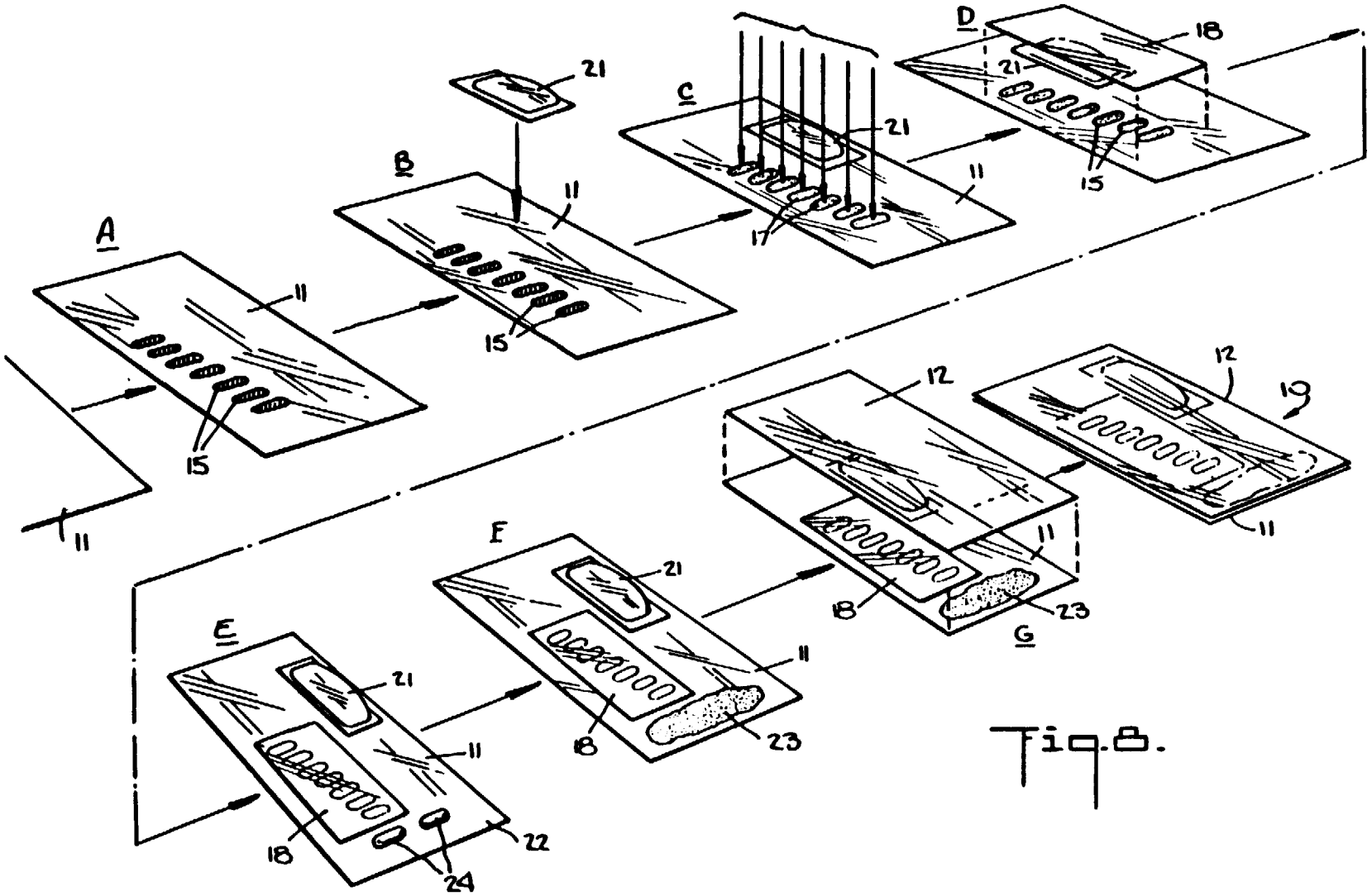
FIG. 8 is a schematic flowsheet depicting the assembly steps for fabricating the embodiment of the bag shown on the foregoing figures.

Automated assembly of bag 10 is schematically shown in FIG. 8 wherein plastic sheet 11 is delivered to Station A where the compartments 15 are formed therein by vacuum forming or the like. The so-formed sheet is then delivered to Station B where the water pouch 21 is placed on sheet 11 to one side of recesses 15 as shown. At Station C, the citric acid 17 is deposited in compartments 15. At Station D, plastic sheet 18 is releasably adhered to sheet 11 at margins 19 and angular portions 20a to enclose compartments 15 and provide assurance that the recesses will be opened one at a time. At station E, time release capsules are deposited on sheet 11 near one end 22. At Station F, the sodium bicarbonate powder 23 is deposited on sheet 11. At Station G, top sheet 12 is sealed at its margin to sheet 11 and at portion 20 to sheet 18 providing completed bag assembly 10 ready for utilization.

Figure 9:
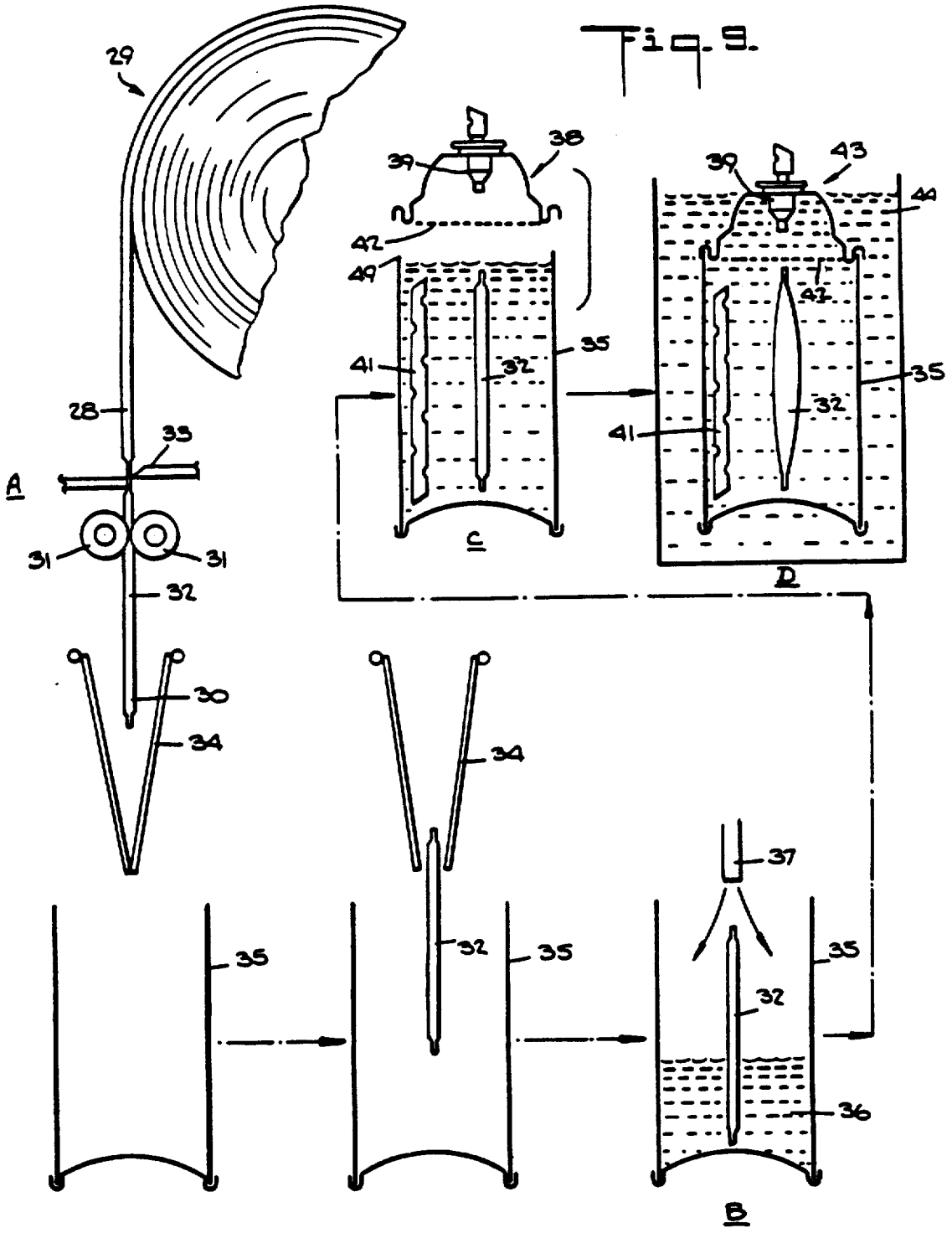
FIG. 9 is a schematic flowsheet depicting the final assembly steps of the bag with the fluid product and other aerosol can components.

As shown in FIG. 9, the fabrication of bag 10 can be effected in a continuous strip 28 providing a plurality of successive similar bags and incorporated in a supply roll 29 which may be delivered to automatic package assembly equipment shown schematically in FIG. 9. The package containing continuous strip 29 is delivered to a first Station A at which the delivery end 30 of strip 29 is held at one side by rolls 31 and the first bag member 32 is severed by cutting means 33 whereby bag 32 is delivered to receiving hopper 34 disposed over can body 35. Simultaneously during such operation rolls 31 rupture the water bag 21 as the bag 32 passes therethrough, thereby delivering water to the bottom of bag 10 to dissolve component 23 and begin activation of time release capsules 24.

Hopper 34 opens to deliver bag 32 to the interior of can 35 which is ten delivered to Station B where fluid product 36 is introduced into can 35 by nozzle means 37. At Station C conventional cap means 38 including aerosol valve assembly 39 are affixed to top 49 of can 35. Prior to such sealing perforated tube 41 is inserted in the interior of can 35 to prevent expansion of bag 32 during use all the way to the sides of the can thereby possibly trapping some of the liquid product 36 and preventing dispensing thereof. Means 38 includes perforated member 42 to similarly prevent bag 32 from blocking the aerosol valve 39. After complete assembly, the fully assembled container 43 is immersed in not water bath 44, if necessary, to activate the time release capsule and water solution of sodium bicarbonate which initially expands the bag as shown at Station D.

Figure 1:
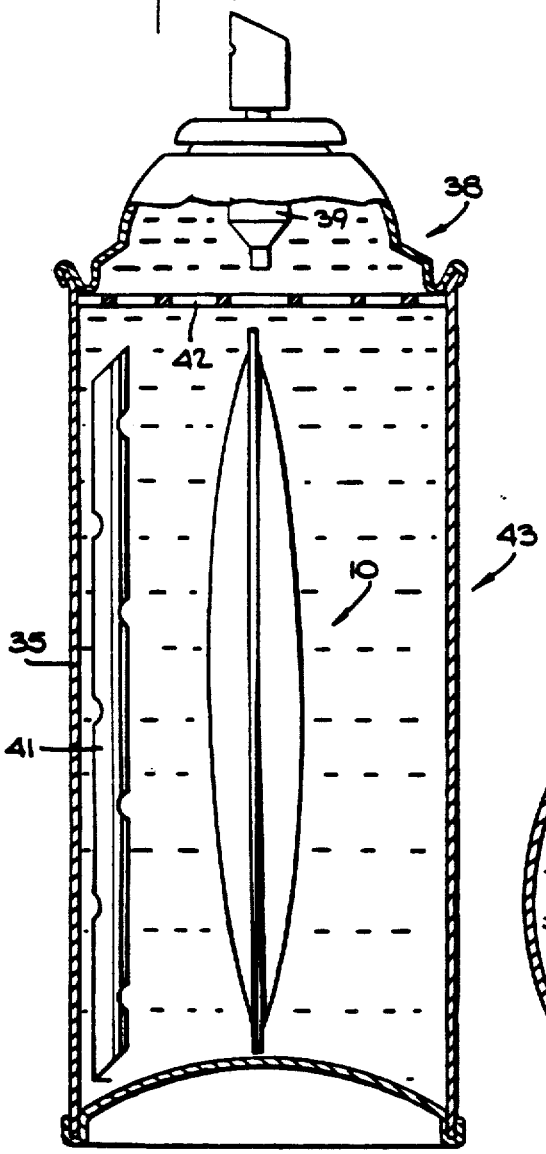
FIG. 1 is an elevational section of a typical aerosol-type container incorporating the bag of the present invention.
Figure 2:
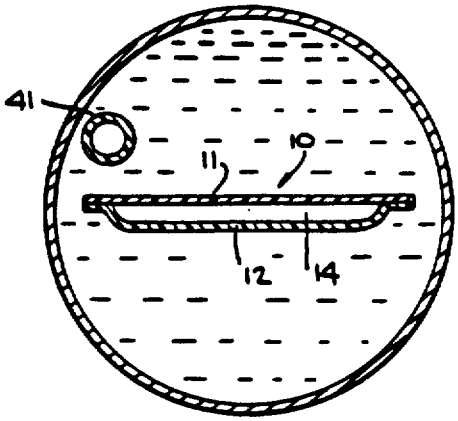
FIG. 2 is a sectionalized top plan view of a similar container showing the bag in initial collapsed condition.
Figure 3:
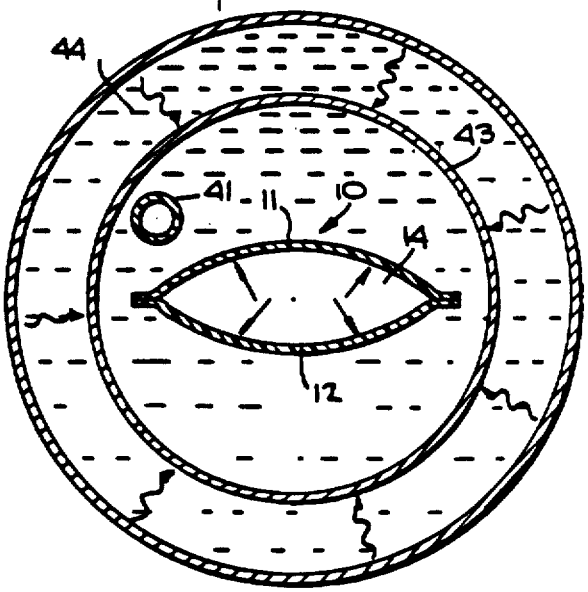
FIG. 3 is sectionalized top plan view of the device of FIG. 2 during initial activation of the bag.

FIGS. 1, 2 and 3 show the overall action of the bag 10 in aerosol can 43 during use. FIG. 1 is the approximate relation of the assembly at initial activation. FIG. 2 shows the bag in its fully collapsed condition prior to activation and FIG. 3 shows the conditions of the bag during the heat activation steps.

Figure 13:
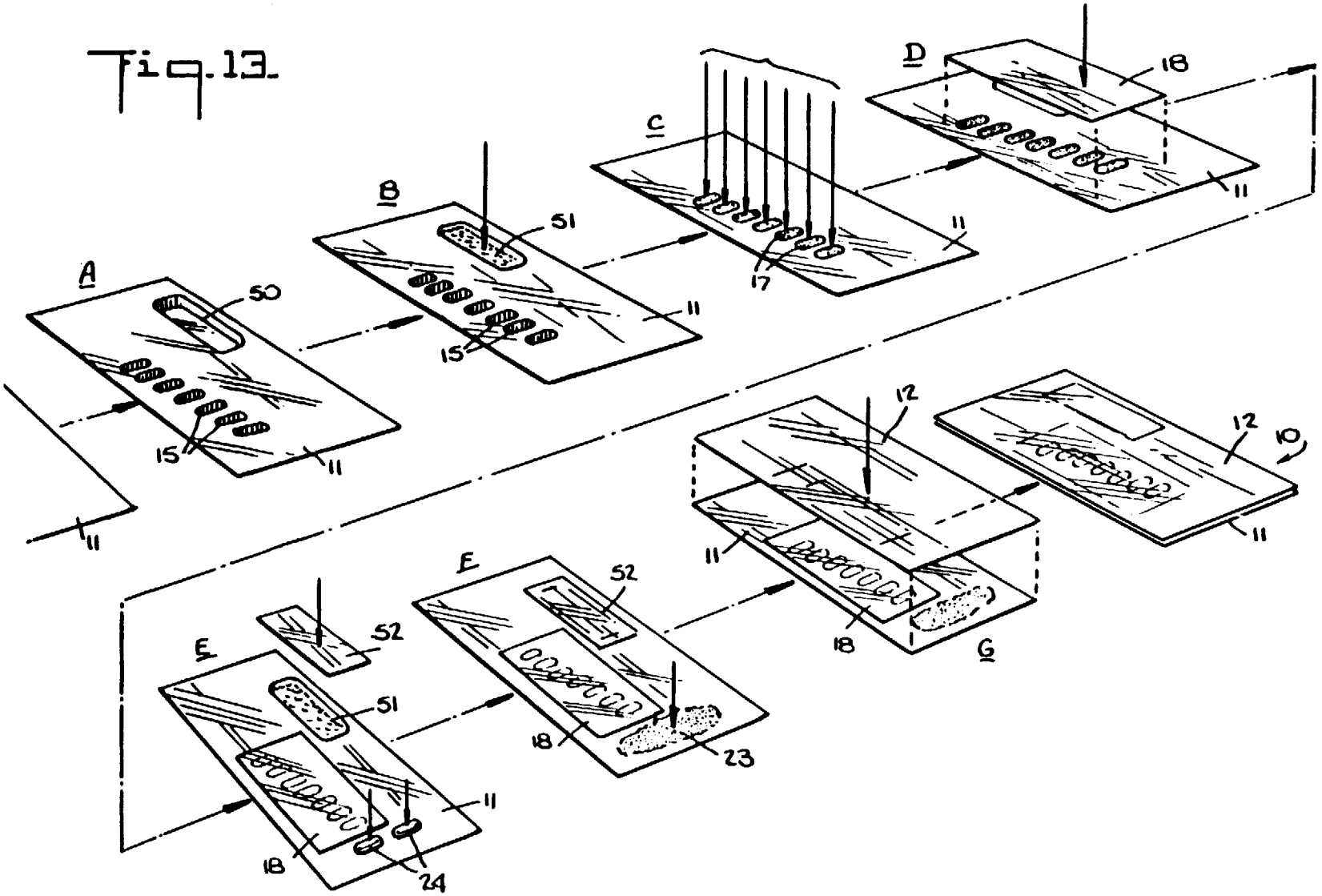
FIG. 13 is a schematic flowsheet depicting the assembly steps for fabricating the embodiment of the bag shown in FIGS. 10–12.

Another embodiment of bag 10 is shown in FIGS. 10–12 and its method of assembly shown in FIG. 13. In this embodiment, in lieu of water bag 21, an enlarged recess or compartment 50 is formed in sheet 11 to one side thereof (see FIG. 6) during formation of the other recesses 15 and the solvent or water 51 is disposed therein. Rupturable plastic cover sheet 52 is heat sealed or otherwise adhered sheet 11 to enclose compartment 50.

Referring to FIG. 13, the method of assembly of the embodiment of bag 10 is shown. Sheet 11 is delivered to Station A at which recesses 15 and compartment 50 are vacuum formed. At Station B water 51 is added to compartment 50. At Station C citric acid 17 is added to recesses 15. At Station D cover sheet 18 is adhered to sheet 11 at the margins 19 and angular portions 20a to cover recesses 15 and to provide assurance that the recesses 15 will be opened one at a time. At Station E cover sheet 52 is adhered to sheet 11 to cover water compartment 50 and capsules 24 are deposited on sheet 11 near one end 22 thereof. At Station F sodium bicarbonate 23 is deposited on sheet 11. At Station G sheet 12 is adhered at its margins to sheet 11, and at portion 20 to sheet 18 to provide fully assembled bag 10.

As can be appreciated from the foregoing description, an expansible, self-contained, pressure generating unit is provided that can be fabricated at one location and conditioned for operation at another location. The unit is easily assembled in a dispensing container and provides a relatively constant dispensing pressure during use without coming into contact with the dispensed material. The container can be oriented in any position without loss of the propellant. No flammability or environmental contamination problems are involved.

When required for specific additional protection of the cavities 15 an additional outer layer of foil or film can be laminated or heat sealed to the other surface of sheet 11 to protect the cavities.

While certain embodiments have been shown and described herein, it is to be understood that certain changes can be made by those skilled in the art without departing from the scope and spirit of the invention.

What is claimed is:

1. The method of fabricating a fluid impervious expandable enclosed bag containing separately compartmented first and second gas generating components which, upon admixture in successive amounts, generate gas causing said bag to expand gradually from a collapsed condition to an ultimate fully expanded condition comprising the steps of:

(a) forming a group of pockets in a first plastic sheet, said pockets being aligned in a staggered series;

(b) fabricating a rupturable solvent containing means associated with said first sheet;

(c) introducing measured amounts of said first component into each pocket of said group;

(d) placing a second plastic sheet over said first group of pockets and releasably sealing it at least at its marginal areas to said first sheet;

(e) placing time release capsule containing said first component, and a measured amount of said second component on a portion of said first sheet spaced from all of said pockets; and (f) permanently sealing a third plastic sheet to said first sheet at the marginal areas of both and to said second sheet to provide a bag-like enclosure containing within its interior all of said compartments, and said second compartment.

2. In the method of claim 1, each said sheet being laminated polyethylene/polypropylene, and having the releasably sealed surfaces being a polyethylene to polypropylene bond and the permanently sealed surfaces being a homogeneous bond of the same plastic.

3. In the method of claim 2, step (a) using vacuum forming and steps (d) and (f) employing heat sealing.

4. In the method of claim 3, the measured amounts of said first component totalling the stoichiometric amount required to completely react with the measured amount of said second component in step (e), and the amount of solvent medium in step (b) being sufficient to dissolve all of said first and second components.

5. The method according to claim 4 including forming successive interconnected bags in a continuous plastic sheet, winding said continuous sheet containing the formed bags into a supply roll for transport and subsequent use.

6. In the method of claim 4, said first component is citric acid, said second component sodium bicarbonate, and said solvent medium is water.

7. The method of fabricating a fluid impervious expandable enclosed bag containing separately compartmented first and second gas generating components which, upon admixture in successive amounts, generate gas causing said bag to expand gradually from a collapsed condition to an ultimate fully expanded condition comprising the steps of:

(a) forming a plurality of pockets in a first plastic sheet, said pockets being aligned in a staggered series;

(b) introducing measured amounts of said first component into each pocket of said group;

(c) placing a rupturable plastic enclosure on said first sheet containing a solvent medium and said second component;

(d) placing a second plastic sheet over said pockets and releasably sealing it at least at its marginal areas to said first sheet; and (e) permanently sealing a third plastic sheet to said first sheet at the marginal areas of both and to said second sheet to provide a bag-like enclosure containing within its interior all of said compartments, said second sheet and said enclosure.

8. The method of fabricating an aerosol-type container for dispensing a liquid product on demand in which the internal pressurizing means in said container is a fluid impervious expandable enclosed bag containing separately compartmented first and second gas generating components which, upon admixture in successive amounts, generate gas causing said bag to expand gradually from a collapsed condition to an ultimate fully expanded condition comprising the steps of:

(a) forming a plurality of pockets in a first continuous plastic sheet, said pockets being aligned in a staggered series;

(b) introducing measured amounts of said first component into each pocket;

(c) placing a time release capsule containing said first component, and a rupturable plastic enclosure on said first continuous sheet containing a solvent medium and said second component;

(d) placing a second plastic sheet over said first continuous group of pockets and releasably sealing it at least at its marginal areas to said first sheet;

(e) permanently sealing a third plastic sheet to said first continuous sheet at the marginal areas of both and to said second sheet to provide a bag-like enclosure containing within its interior all of said compartments, said second sheet and said enclosure;

(f) forming successive bags in said first continuous sheet;

(g) winding said continuous sheet containing the formed bags into a supply roll having a delivery end presenting a first bag;

(h) positioning the body of said container adjacent said supply roll;

(i) breaking said rupturable enclosure in the bag at said delivery end to bring its contents into contact with said time release capsule;

(j) severing the bag in step (i) from said roll and inserting said bag into said container;

(k) introducing said liquid product into said container; and (l) affixing a top with associated dispensing means on said container to enclose the same.

9. In the method of claim 8, heating said container sufficiently to enhance activation of the admixture of said time release capsule and said second component in said solvent medium.

10. In the method of claim 7, step (d) including releasably sealing said second sheet to said first sheet in a plurality of relatively short angular guard seals adjacent said pockets and step (e) including permanently sealing said second and third sheets together in an elongated separation seal running generally longitudinally and centrally of said bag.

11. In the method of claim 8, step (d) including releasably sealing said second sheet to said first sheet in a plurality of relatively short angular guard seals adjacent said pockets and step (e) including permanently sealing said second and third sheets together in an elongated separation seal running generally longitudinally and centrally of said bag.

12. The method of assembling an aerosol-type container for dispensing a liquid product on demand in which the internal pressurizing means in said container is a fluid impervious expandable enclosed bag containing separately compartmented first and second gas generating components which, upon admixture in successive amounts, generate gas causing said bag to expand gradually from a collapsed condition to an ultimate fully expanded condition comprising the steps of:

(a) providing a supply [roll] *means* containing the formed bags and having a delivery end presenting a first bag, each of said bags having a time release capsule and a rupturable enclosure containing a solvent medium therein;

(b) positioning the body portion of said aerosol-type container adjacent said supply [roll] *means*;

(c) breaking said rupturable enclosure in the bag at said delivery end to bring its contents into contact with said time release capsule;

(d) [severing the bag in step (c) from said roll and] inserting said bag into said container;

(e) introducing said liquid product into said container; and (f) affixing a top with associated dispensing means on said container to enclose the same.

13. In the method of claim 12, heating said container sufficiently to enhance activation of the admixture of said time release capsule and the second gas generating component in said solvent medium.

14. A method of assembling an aerosol-type container for dispensing a liquid product on demand in which the internal pressurizing means in said container is a fluid impervious expandable enclosed bag containing separately compartmental first and second gas generating components which, upon admixture in successive amounts, generate gas causing said bag to expand gradually from a collapsed condition to an ultimate fully expanded condition comprising the steps of:

(a) routing said aerosol-type containers along a predetermined path to an insertion station;

(b) feeding a supply [roll] of said expandable enclosed bags to the insertion station;

(c) breaking one of said compartmented gas generating components to release its contents and permit contact with the other of said gas generating components;

(d) [severing the individual] *removing a* bag from said supply [roll];

(e) inserting the [severed] bag into said aerosol type container;

(f) introducing the liquid product into the container; and (g) affixing a top on said container thereby enclosing the same.

15. The method of claim 14 which further includes the steps of providing a time release capsule in said bag and routing said aerosol container with bag inserted therein to a heated medium to activate the time release capsule and the gas generating components.

*16. In the method of claim 12, said supply means being a supply roll, the step of severing the bag in step (c) from said supply roll prior to insertion into said container.*

*17. The method of claim 14 wherein said step of removing comprises severing an individual bag from said supply, said supply comprising a supply roll of attached ones of said bags.*

* * * * *